(12) United States Patent
Jones

(10) Patent No.: US 6,630,093 B1
(45) Date of Patent: Oct. 7, 2003

(54) METHOD FOR MAKING FREEFORM-FABRICATED CORE COMPOSITE ARTICLES

(76) Inventor: Ronald D. Jones, 5919 E. 53rd St., Tulsa, OK (US) 74135

( * ) Notice: Subject to any disclaimer, the term of this patent is extended or adjusted under 35 U.S.C. 154(b) by 94 days.

(21) Appl. No.: 09/641,405

(22) Filed: Aug. 17, 2000

Related U.S. Application Data

(60) Provisional application No. 60/150,209, filed on Aug. 21, 1999.

(51) Int. Cl.$^7$ .................. B29C 35/08; B29C 41/02; B29C 70/44; G06F 17/50; G06F 19/00
(52) U.S. Cl. .................. 264/401; 264/136; 264/137; 264/160; 264/162; 264/236; 264/257; 264/308; 264/313; 264/497; 264/510; 700/118; 700/119; 700/120
(58) Field of Search .................. 264/136, 137, 264/160, 162, 236, 257, 308, 313, 401, 497, 510; 700/118, 119, 120

(56) References Cited

U.S. PATENT DOCUMENTS

| | | |
|---|---|---|
| 4,752,498 A | 6/1988 | Fudim |
| 4,801,477 A | 1/1989 | Fudim |
| 5,088,047 A | 2/1992 | Bynum |
| 5,216,616 A | 6/1993 | Masters |
| 5,256,340 A | 10/1993 | Allison et al. |
| 5,415,820 A | 5/1995 | Furuta et al. |
| 5,482,659 A | 1/1996 | Sauerhoefer |
| 5,545,367 A | 8/1996 | Bae et al. |
| 5,609,813 A | 3/1997 | Allison et al. |
| 5,616,293 A | 4/1997 | Ashtiani-Zarandi et al. |
| 5,711,911 A | 1/1998 | Hull |
| 5,728,345 A | 3/1998 | Hlavaty et al. |
| 5,740,051 A | 4/1998 | Sanders, Jr. et al. |
| 5,785,919 A | 7/1998 | Wilson |
| 5,855,718 A | 1/1999 | Nguyen et al. |
| 5,897,739 A | 4/1999 | Forster et al. |
| 5,989,664 A | * 11/1999 | Takayama et al. ......... 428/36.1 |

* cited by examiner

Primary Examiner—Leo B. Tentoni

(57) ABSTRACT

A method for making freeform-fabricated core composite articles using freeform-fabricated machine. The articles are capable of being utilized as end products rather than prototype models by creating a core having an interior structure to provide strength to the core and to enhance the strength to weight ratio of the article.

115 Claims, 6 Drawing Sheets

METHOD FOR MAKING FREEFORM-FABRICATED CORE COMPOSITE ARTICLES

This application claims the benefit of provisional application Ser. No. 60/150,209 filed Aug. 21, 1999.

TECHNICAL FIELD

This invention relates to the manufacture of freeform-fabricated core composite articles, and more specifically, to a method of manufacturing composite articles wherein the core is fabricated in a freeform-fabrication machine, which exactly matches the article's geometry and dimensional specifications. This method eliminates the need to construct rigid molds, sculpted plugs, sculpted cores or preformers.

BACKGROUND OF THE INVENTION

Composite articles are used to produce items that must be lightweight but very strong and very durable. For example, composite fabricated articles have been embraced by the aerospace industry in recent years, where advanced composites have been used to build airframe structures such as wing skins, fuselage sections and many other internal structures and components. In fact, several newly designed general aviation aircraft and most new military aircraft are comprised largely of composite materials. While expensive to develop and perfect, composite-framed aircrafts are lighter, stronger, and more durable than metal-framed aircrafts. Advanced composites are also used to produce a wide-range of other products, such as top-of-the-line sporting goods and racing bikes, but their use in these products are normally limited to applications where the superior properties of the composite (i.e.: high strength to a weight ratio, resistance to corrosion and ease of repairability) is of greater importance than the relatively higher cost of the composite and overall greater cost of manufacturing with composite materials when compared to traditional materials.

Unfortunately, the higher cost of composite product development and manufacturing, compared to manufacturing with traditional materials, is not sufficiently offset by their desirable qualities to be a practical alternative for most mass production durable goods industries.

Much of the higher cost attributed to manufacturing products in advanced composites is due, in large part, to the current method of production that relies upon the use of part specific rigid molds or sculpted plugs. When the product involves complex geometry or when design changes are likely during development and testing, the tooling cost alone can render all but the "highest valued" products uneconomical :using current composite manufacturing methods. Many products could benefit, however, from the added strength, better durability and lighter weight that is realized using composite materials if a method were available that would reduce the cost to manufacture the article using composite materials.

Composite articles typically comprise a core, a plurality of composite skins and an adhesive film. The core is either formed in the basic shape of the desired composite article or is held to a desired shape by a rigid mold. The composite skin comprises one or more thin layers of material used to cover the exterior of the core and is comprised of one or more laminates of impregnated fiber reinforced composite material having a fiber reinforcement such as graphic, aramid or fiberglass fibers disposed in a binding matrix such as epoxy, phenolic or other similar resinous material. Most of the composite articles produced with present methods require a multi-layered composite skin in order to provide the compressive reinforcement required for the composite article. The adhesive film holds the composite skins in place against the exterior surface of the core during the fabrication process and promotes the bond between the composite skins and the core to produce a composite article with the desired physical properties and shape. In certain applications, reinforcing core sheeting material is "sandwiched" in between the composite skins, thus creating a sheet of reinforced core composite material, which can then be used in place of other sheeting materials. The composite skins are positioned directly against the mold or sculpted core by hand to create an assembly referred to as a "lay-up". In a few industries, the manual lay-up process has been replaced by the use of robotic automated tow placement machines.

The most common method of manufacturing composite articles n involves the use of a vacuum bag assembly wherein an impervious membrane or "vacuum bag" is employed to consolidate the plurality of composite skins with the core to ensure proper adhesion thereof. The lay-up is placed inside a vacuum bag assembly where vacuum pressure consolidates the composite skins with the core. To improve surface finish, the lay-up assembly is sometimes positioned directly against female molds before being placed in a vacuum bag. Then the lay-up assembly, inside the vacuum bag assembly, is "cured" by placing it under constant vacuum pressure within an autoclave, thereby subjecting the lay-up assembly to a higher than ambient temperature and/or higher than ambient atmospheric, pressure for a prescribed period of time. Some binding matrix and composite material combinations are able to cure at ambient atmospheric temperature and pressure and thus may be oven or dry air cured.

Rigid molds are most commonly formed using a "part positive" as a pattern made from plaster, silicone or other similar material. The resultant negative mold is then used to form a more durable mold. When a 3D CAD design of the article is available, negative molds may also be milled or machine sculpted from a block of solid material. Rigid production molds are formed using various materials and methods depending upon the industry and the application. Rigid molds are commonly constructed from steel, cured composite, wood, ceramic or other rigid material.

Aerospace advanced composite parts, where quality and repeatability are vitally important, are commonly fabricated by first creating "outer skins" by shaping composite skins against rigid part specific molds, hollow structures, or tubes made from shaped plugs, or by "build-ups" that are fabricated using multiple layers of the composite skins over a mandrel. In some instances, such as in helicopter or propeller blades, the build-up is fabricated by placing multiple layers of the composite skins over shaped wood cores where the wood cores are sometimes referred to as "pre-formers". To achieve the desired level of repeatability necessary to meet government or customer requirements, rigid mold produced composite articles represent the largest portion of the current market. For this process, a composite skin is produced first with the focus of capturing the external geometry of the article. Internal structures are mated to the skin using adhesives. The rigid mold itself is often used as a fixture to hold the various composite and non-composite component parts in place during the bonding and curing process. The resulting complex bonded assemblies, which due to the nature of their assembly, may suffer de-bonding or delamination over time. Take the example of an aircraft wing. In a simple design, the upper and lower wing surfaces are formed by "laying up" composite skins over a sculpted foam plug. The foam material adds compressive strength to the wing, but precludes the use of the internal space to house fuel or other components. In more complex aircraft, aircraft wings must carry fuel, landing gear, electronics, electrical wiring, hydraulic lines, fuel pumps and control system components to name a few. Individual composite components mated in a wing assembly may total eighty or more separate components. Currently, composite product designers are confronted with the potential hazard of de-bonding and dissimilar materials corrosion as well as the challenges of accurate placement-of parts within the assembly.

As an alternative to rigid molds, the part positive can be produced as a composite article using a sculpted plug as a core. Sculpted plugs are formed in various ways. Computer controlled routers, CNC mills and lathes are often employed to create an accurately shaped plug. Hand shaping, using spaced sectional patterns as a guide are still common in certain industries. Plugs are also shaped using a "hot wire" device as a cutting tool to sculpt polyurethane, polystyrene or divinycell foam blocks.

The advantages of using freeform-fabrication technologies, also called "rapid prototyping" or "layer fabrication", to develop prototypes of new products are well known by the market leaders in most manufacturing sectors. First, most of the newer freeform-fabrication machines, such as a stereolithography apparatus ("SLA") and other similar layer fabrication machines, can produce exacting prototype models directly from three, dimensional CAD designs. Second, the prototypes of the new products, made by these freeform-fabrication machines, are commonly used today during the design and development of the new products to determine both the form and the fit of the new product, and, in many instances, allow for functional testing as well. When freeform-fabricated prototypes, made using freeform-fabrication machines like SLA, are used early in the design process, manufacturers are able to preclude most of the design flaws that commonly occur later in the development process when they are much more expensive to correct.

3D Systems of Valencia, Calif., the developers of the stereolithography fabrication process, manufacture the most popular line of freeform-fabrication machines, which utilize stereolithography technology, in use by industry today. In fact, the SLA7000, 3D Systems' most advanced freeform-fabrication machine, is capable of great accuracy, rivaling even the best CNC machining processes, and has a throughput speed that, for the first time, allows a SLA freeform-fabrication machine to compete as a production system in certain applications.

Other types of freeform-fabrication machines used today to produce freeform-fabricated articles include selective laser sintering ("SLS"), fused deposition modeling ("FDM"), and laminated object manufacturing ("LOM"). Each type of freeform-fabrication machine on the market today produces articles with different characteristics. 3D Systems uses photo-curable polymers that, when cured, resemble many of the popular thermoplastics in use today. Today, the strongest of these photopolymers simulate the physical properties of polypropylene, whereas, the photopolymers that are currently in development are planned to emulate the characteristics of polycarbonate, a tough, resilient thermoplastic used extensively in durable goods manufacturing. Stratysis, the developer of fused deposition modeling ("FDM"), offers machines to produce articles in a thermoplastic that emulates the properties of ABS plastic, a material used extensively throughout the automotive and aircraft industries. DTM's selective laser sintering ("SLS") process uses a variety of waxes, nylons and sintered metals to produce freeform-fabricated prototypes. Helysis, the sole remaining vendor of laminated object manufacturing ("LOM") equipment, produces freeform-fabricated articles using thin sheets of plastics or paper and a cutting laser to produce 3-dimensional articles. While LOM machines are less frequently used today for rapid prototyping, some research is ongoing to employ the process to create articles in carbon fiber and other fibrous materials.

One of the advantages of using a freeform-fabrication machine to fabricate an article is that the interior structure of the article can be easily and cost effectively fabricated in a non-solid, thin-walled or truss style design regardless of the exterior shape of the article. This is important when designing articles that require a high strength to weight ratio. In order to maximize strength while reducing the weight of the article, designers often employ "tensegrity" type structural patterns. When an external force is applied to one area of an article having a tensegrity structure, the force is continuously transmitted across all members of the structure. This is the principle upon which many bridges are built. Tensegrity structures are also commonly found in organic structures found in nature such as cells, bone tissue and cartilage. "Honeycomb" thin-walled type patterns produced in paper, aluminum, and aromatic polyamide cloth are popular for adding thickness to or reinforcing structural composites used in aerospace applications. While not truly tensegrity, the honeycomb geometric shape is popular because of it's relatively low cost of fabrication. Tensegrity structures offer a much higher potential of weight savings due to their ability to distribute tensional and compressive forces evenly throughout the core. Examples of tensegrity geometric shapes include triangles, pyramids, polygons and geodesic spheres or "bucky balls" to name only a few that are possible.

As mentioned earlier, SLA machines use photo-curable polymers to freeform-fabricate articles. Early photo-curable polymers were not known for their durability or strength. Recent advances in SLA materials hold great promise for a variety of prototyping, tooling and specialized manufacturing applications. The newer resins are more resistant to humidity; possess improved tensile strength and are able to withstand temperatures exceeding 120° C.

DISCLOSURE OF THE INVENTION

The freeform-fabricated core composite article comprises a freeform-fabricated core and a plurality of composite skins that are cured under vacuum pressure to produce the freeform-fabricated core composite article. It is sometimes necessary to use an adhesive film to attach the composite skins to the exterior surface of the freeform-fabricated core so that the composite skins will remain in place during the fabrication process.

The freeform-fabricated core is normally formed in the basic shape of the desired composite article from a large variety of materials; such as polymer resin, metal, paper, ceramic/polymer blend, wax and other man-made or naturally produced materials; having a solid exterior surface structure and an interior structure. The interior structure can be completely solid or completely non-solid, consisting of various thin-walled or truss style patterns, or any combination of solid and non-solid patterns in the same freeform-fabricated core. The freeform-fabricated core is fabricated in a freeform-fabrication machine, which substantially builds the freeform-fabricated core on a layer by layer basis that accommodates any geometric design required for the exterior surface structure and the interior structure. The freeform-fabricated core can be formed from several freeform-fabricated core segments, which are then joined together to create the freeform-fabricated core.

The composite skins are thin layers of material that can be either cured or uncured. A cured composite skin can be made from various types of material, but typically comprises fibrous materials reinforced with polymer based binding matrix composite laminates having a fibrous material reinforcement such as seed, bast, quartz, metal, glass, graphite, carbon, E-Glass, polymer based, ceramic or fiberglass fibers disposed in a polymer based binding matrix such as epoxy, vinyl ester or other similar resinous organic material. The uncured composite skin can be made from various types of materials, but typically comprises one or more laminates of uncured preimpregnated fibrous reinforced composite materials having a fibrous material reinforcement such as seed, bast, quartz, metal, glass, graphite, carbon, E-Glass, polymer based, ceramic or fiberglass fibers disposed in a polymer based binding matrix such as epoxy, vinyl ester or other similar resinous organic material. Metal binding matrix and ceramic binding matrix can be substituted for the polymer based binding matrix to provide more specialized composite systems called metal matrix composites (MMCs) and ceramic matrix composites (CMCs), respectively. The uncured composite skins are impregnated with the desired binding matrix prior to mating with the freeform-fabricated core.

When used, the adhesive film holds the composite skins in place against the exterior surface of the core during the fabrication process and promotes the bond between the composite skins and the freeform-fabricated core. The combination of the plurality of composite skins applied to the freeform-fabricated core is called a "composite lay-up". The composite lay-up is disposed in a vacuum bag forming a cavity between the vacuum bag and the composite lay-up. As the vacuum pressure is placed on the vacuum bag, it evacuates the cavity to urge the vacuum bag against the composite skins thereby compressing the composite skins against the exterior surface structure of the freeform-fabricated core. The vacuum pressure is held on the vacuum bag, preventing displacement of the composite skins, until the freeform-fabricated core composite lay-up has been cured.

By combining the improved fabrication materials, like improved resins, with the improved throughput speed of the freeform-fabrication machines, like the SLA7000, the potential exists (both economically and technically) for the first time to use a freeform-fabrication machine to produce usable end-use articles without the normal sacrificial production steps. The material properties of articles produced using SLS and FDM machines are improving as well. Moreover, their dimensional accuracy, finish quality and ability to reproduce small intricate features are expected to improve over the next few years to the extent that they too may be used successfully to produce freeform-fabricated core composite articles.

A freeform-fabricated core composite article, as described above, is manufactured by the steps of: designing a freeform-fabricated core for a freeform-fabricated core composite article using a three-dimensional computer aided design (3D CAD) program to create a software file of a three-dimensional design generated by a computer of the freeform-fabricated core where the freeform-fabricated core has an exterior surface structure and an interior structure; modifying the software file of the 3D CAD design of the freeform-fabricated core to select the desired internal structural pattern for the freeform-fabricated core's interior (i.e.: a tensegrity structural pattern or solid structure) or any combination of solid and non-solid structural patterns as may be required for the particular article's design; modifying the software file of the 3D CAD design of the freeform-fabricated core to include appropriate interior spaces to accommodate components or other imbedded functionality within the freeform-fabricated composite core; modifying the software file of the 3D CAD design of the freeform-fabricated core to adjust for the plurality of composite skins' thickness in order to obtain desired dimensions of the freeform-fabricated core composite article after the composite skins are attached to the freeform-fabricated core; exporting the modified software file of the 3D CAD design of the freeform-fabricated core into a machine language software file that is suitable for use with the selected type of freeform-fabrication machine; importing the machine language software file of the freeform-fabricated core into a computer workstation, the computer workstation being of the type which products control signals that controls the selected freeform-fabrication machine, where the freeform-fabrication machine has a build platform situated in a fabrication material storage area which holds fabrication material; processing the machine language software file of the freeform-fabricated core by the computer workstation to create a freeform-fabrication software file that contains a plurality of thin horizontal cross-sectional layers of the freeform-fabricated core along a Z-axis, where the Z-axis is the vertical axis of a three-dimensional Cartesian coordination system; selecting desired orientation for fabricating the freeform-fabricated core on the build platform in the selected freeform-fabrication machine; selecting the type and spacing of support posts used, if required, to separate the core from the fabrication machine build platform during fabrication using the freeform-fabrication software file; fabricating the freeform-fabricated core, with build supports as may be required, with the freeform-fabricated machine and the fabrication material from the freeform-fabrication software file in the computer workstation such that the combination of the freeform-fabrication software file, the computer workstation, the freeform-fabrication machine, and the fabrication material cooperate to fabricate the freeform-fabricated core one thin horizontal cross-sectional layer at a time on the build platform; removing the freeform-fabricated core, with its support posts as may be required, from the build platform in the freeform-fabrication machine; cleaning the freeform-fabricated core with solvent prescribed by the material supplier to remove any contaminants (i.e.: non-polymerized photo-polymers) from the surfaces of the freeform-fabricated core; removing supports from the freeform-fabricated core, if required; curing the freeform-fabricated core by exposing the freeform-fabricated core to an external stimulus (i.e. ultraviolet light or heating) as specified by the freeform-fabrication machine manufacturer to further solidify and harden the freeform-fabricated core; finishing the exterior surface of freeform-fabricated core by hand or machine filling, sanding and polishing to eliminate imperfections, blemishes or excess cured polymer; preparing the plurality of composite skins for mating with the freeform-fabricated core by cutting the uncured composite skins into a predetermined pattern to form a single or multi-layered composite skin to mate with the exterior surface structure of the freeform-fabricated core and by impregnating the composite skins with selected binding matrix material (i.e.: polymer, ceramic, metal, vinyl ester or similar resin compound), or alternatively, using "pre-impregnated composite skins" (uncured composite skins wetted with a binding matrix material and frozen for later use) or using cured composite skins; applying adhesive film between the exterior surfaces of the freeform-fabricated core and the plurality of composite skins, if required; mating the impregnated plurality of composite skins to the exterior surface of the freeform-fabricated core to create a composite lay-up of the freeform-fabricated core composite article; disposing a vacuum bag over the composite lay-up forming a cavity between the vacuum bag and the composite lay-up; evacuating the cavity to urge the vacuum bag against the composite skins, thereby compressing the impregnated composite skin against the exterior surface structure of the freeform-fabricated core to prevent displacement of the composite skins; and curing the composite lay-up wherein the composite lay-up is subjected to external stimulus that solidifies and hardens the composite lay-up to manufacture a freeform-fabricated core composite article.

It is the object of the present invention to provide a method for manufacturing a composite article of high quality and with repeatable results without the use of rigid part specific molds or shaped plugs by creating a freeform-fabricated core using a freeform-fabrication machine and freeform-fabrication material.

It is the object of the present invention to provide a method for manufacturing composite articles having a freeform-fabricated core with a non-solid interior structure to provide a lightweight but strong composite article.

It is another object of the present invention to provide a method for manufacturing a composite article that reduces the steps previously involved to manufacture a composite article.

Another object of the present invention is to provide a method for manufacturing a composite article that reduces the costs of manufacturing the composite article.

It is yet another object of the present invention to provide a method for manufacturing a composite article that reduces the time to manufacture a composite article.

It is yet another object of the present invention to provide a method for manufacturing a composite article that includes imbedding or integrating components or creating additional functionality within the composite article in a cost effective process that also produces high quality composite articles.

Still yet, another object of the present invention is to provide a method for manufacturing a composite article which provides some of the advantages found in the apparatuses and methods of the prior art thereof, while simultaneously overcoming some of the disadvantages normally associated therewith.

The forgoing and other objects, features and advantages of the present invention will become more apparent in light of the following detailed description of embodiments thereof, as illustrated in the accompanying drawings.

BRIEF DESCRIPTION OF THE DRAWINGS

These and other features, aspects, and advantages of the present invention will become better understood with respect to the following description and accompanying drawings where.

BEST MODE FOR CARRYING OUT THE INVENTION

Figure 1:
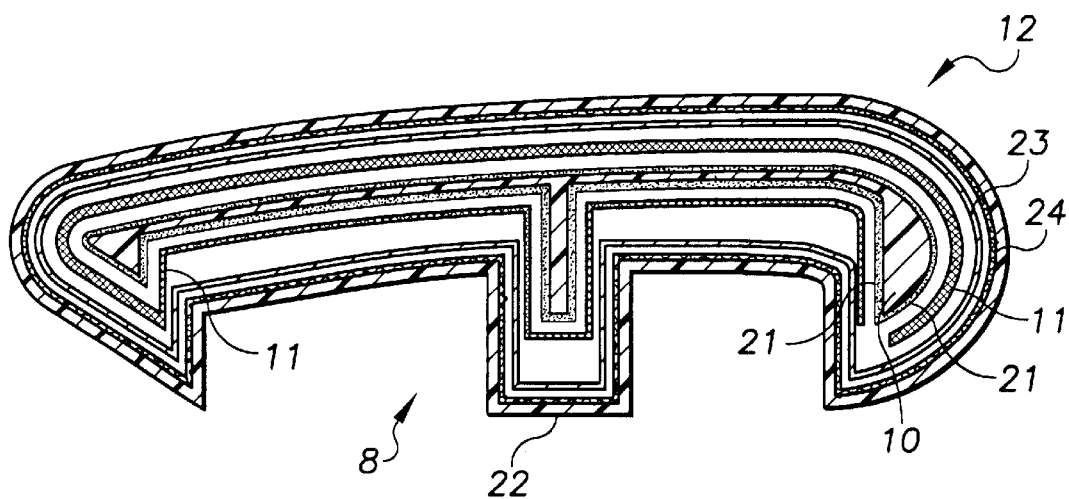
FIG. 1 is an exploded cross-sectional view of a freeform-fabricated core composite lay-up of one embodiment of the freeform-fabricated core composite article where a vacuum bag assembly is disposed over the composite lay-up.

Referring to the figures of the drawings, wherein like numerals of reference designate like elements throughout the several views, particularly to FIG. 1, there is shown an exploded cross-sectional view of a freeform-fabricated core composite lay-up (12) of one embodiment of the freeform-fabricated core composite article (8) where a vacuum bag assembly is disposed over the composite lay-up (12).

As shown in FIG. 1, the freeform-fabricated core composite article (8) comprises a freeform-fabricated core (10)

and a plurality of composite skins (11). It is sometimes necessary to use an adhesive film (21) to attach the composite skins (11) to the exterior surface of the freeform-fabricated core (10) so that the composite skins (11) will remain in place during the fabrication process.

Figure 5:
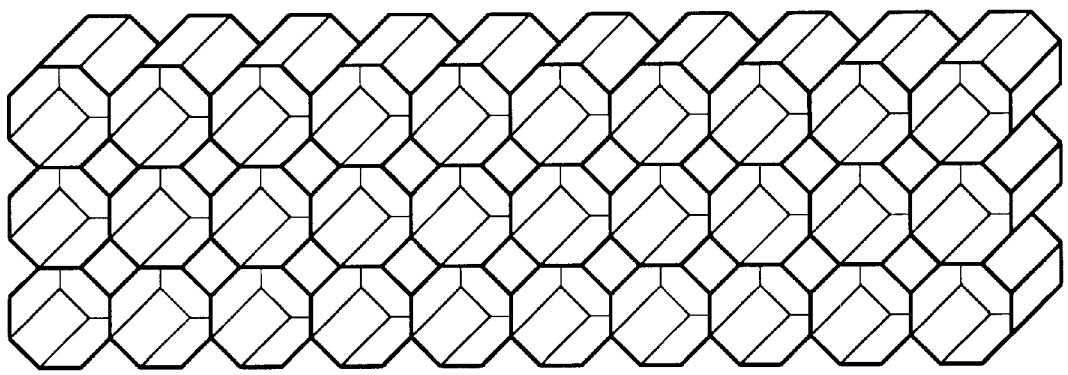
FIG. 5 is a partial cross-sectional perspective view of a honeycomb pattern structure used in the interior of the freeform-fabricated core.
Figure 14:
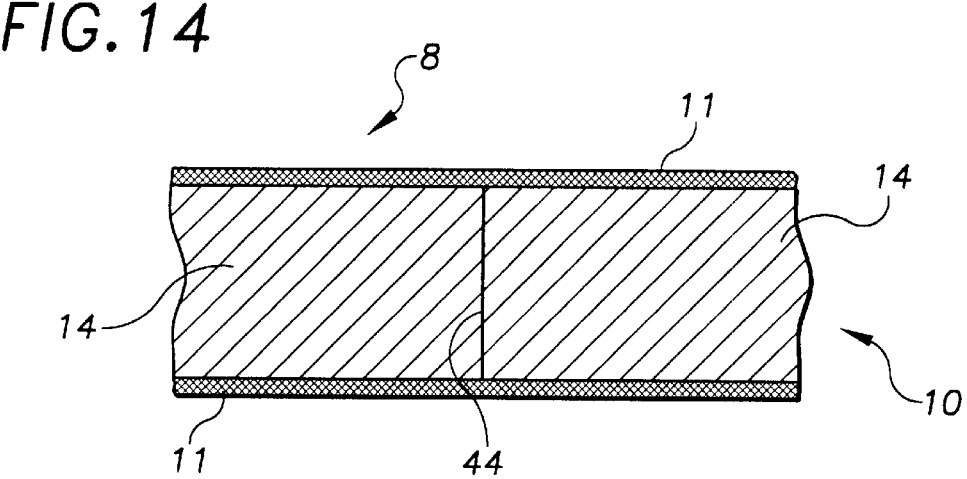
FIG. 14 is a partial sectional view of the invention taken along the line 1—1 of FIG. 4 that shows a joint between two freeform-fabricated core segments required to accommodate a freeform-fabricated core that is larger than the freeform-fabrication machine's build area.

The freeform-fabricated core (10) is normally formed in the basic shape of the desired freeform-fabricated core composite article (8) in a freeform-fabrication machine from a large variety of materials; such as polymer resin, paper, metal, ceramic/polymer blend, wax and other man-made or naturally produced materials that are suitable for use in the selected freeform-fabrication machine. Because of the freeform-fabrication machine's capabilities, the freeform-fabricated core (10) can have a solid exterior surface structure and a solid interior structure or an interior structure consisting of various non-solid structures, for example a honeycomb pattern structure (30) as seen in FIG. 5, or any combination of solid or non-solid structures. The freeform-fabricated core (10) can be formed from several freeform-fabricated core segments (14), which are joined together at a core joint (44) to create the freeform-fabricated core (10) as shown in FIG. 14. Once the freeform-fabricated core (10) has been fabricated, it must be prepared for mating with the plurality of composite skins (11) by removing the freeform-fabricated core (10) from the freeform-fabrication machine, then cleaning the freeform-fabricated core (10) to remove contaminates, then curing the freeform-fabricated core (10) to further solidify and harden the freeform-fabricated core (10) and then finishing the cured freeform-fabricated core (10) to eliminate imperfections, blemishes or excess cured fabrication material.

As shown in FIG. 1, the composite skins (11) are thin layers of material. The composite skins (11) can be either cured or uncured. A cured composite skin (11) can be made from various types of material, but typically comprises fibrous materials reinforced with polymer based binding matrix composite laminates having a fibrous material reinforcement such as seed, bast, vascular, metal, glass, quartz, graphite, carbon, E-Glass, polymer based, ceramic or fiberglass fibers disposed in a polymer based binding matrix such as epoxy, vinyl ester or other similar resinous organic material. The uncured composite skin (11) can be made from various types of materials, but typically comprises one or more laminates of uncured preimpregnated fibrous reinforced composite materials having a fibrous material reinforcement such as seed, bast, vascular, quartz, metal, glass, graphite, carbon, E-Glass, polymer based, ceramic or fiberglass fibers disposed in a polymer based binding matrix such as epoxy, vinyl ester or other similar resinous organic material. Metal binding matrix and ceramic binding matrix can be substituted for the polymer based binding matrix to provide more specialized composite systems called metal matrix composites (MMCs) and ceramic matrix composites (CMCs), respectively. The uncured composite skins (11) are impregnated with the desired binding matrix prior to mating with the freeform-fabricated core (10). Depending upon the application, the freeform-fabricated core composite article (8) can incorporate a single layer of composite skin (11), multi-layers of composite skins (11) or a combination of a single layer of composite skin (11) in a predetermined region of the freeform-fabricated core composite article (8) and multi-layers of the composite skins (11) in a different predetermined region of the freeform-fabricated core composite article (8). Also depending on the application, the freeform-fabricated core composite article (8) can incorporate one thickness of composite skins (11) in a predetermined region of the freeform-fabricated core composite article (8) and another thickness of composite skins (11) in a different predetermined region of the freeform-fabricated core composite article (8). The composite skins (11) are prepared for mating with the exterior surface structure of the freeform-fabricated core (10) by cutting the plurality of composite skins (11) in a predetermined pattern and by impregnating the plurality of composite skins (11) with binding matrix.

When used, the adhesive film (21) is applied between the exterior surface structure of the freeform-fabricated core (10) and the plurality of composite skins (11). The adhesive film (21) holds the composite skins (11) in place against the exterior surface of the freeform-fabricated core (10) during the fabrication process and promotes the bond between the composite skins (11) and the freeform-fabricated core (10) by the binding matrix. An example of an acceptable adhesive film (21) is EA 9690 manufactured by Hysol Corp located in Pittsburgh, Calif.

Figure 2:
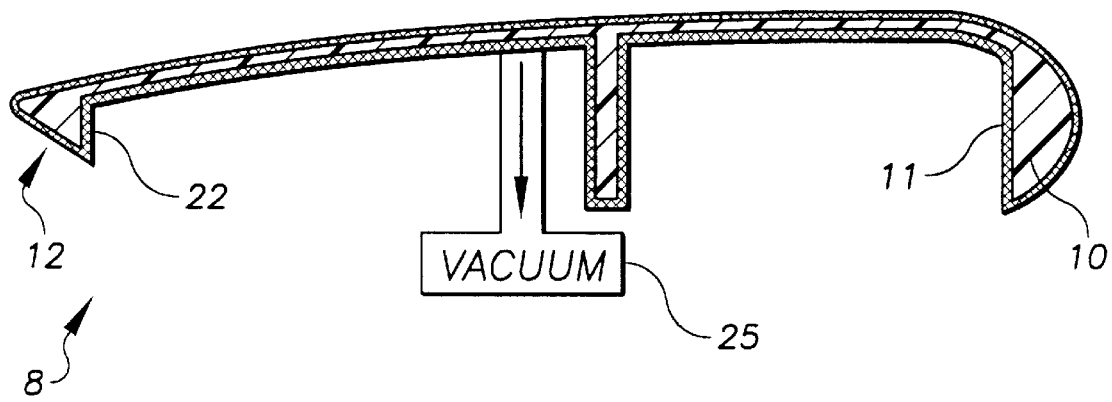
FIG. 2 is a cross-sectional view of the embodiment of the invention shown in FIG. 1 where vacuum pressure, from a vacuum pump, has evacuated the cavity to urge the vacuum bag against the composite skins thereby compressing the composite skins against the exterior surface structure of the freeform-fabricated core.
Figure 3:
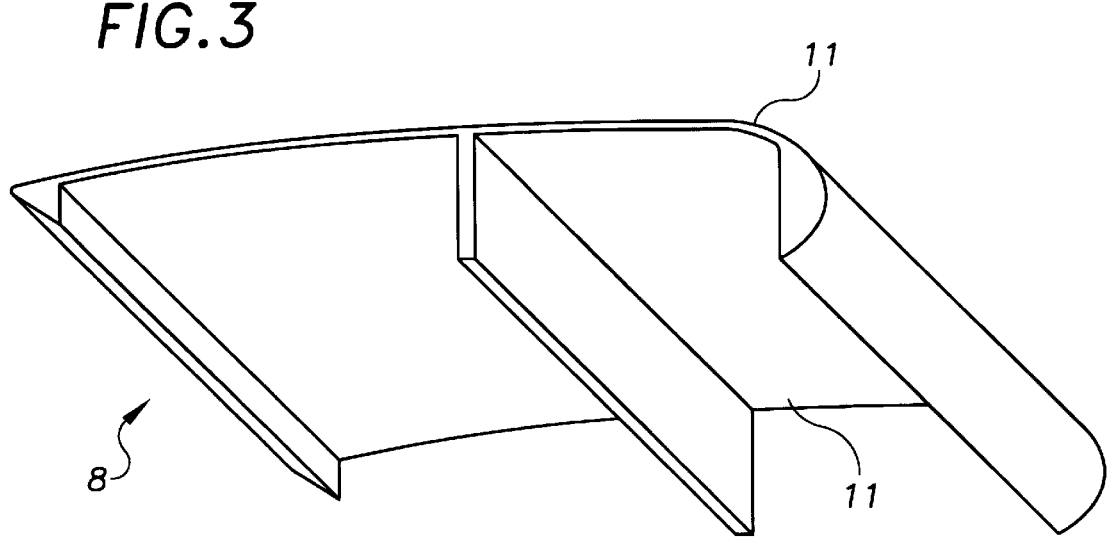
FIG. 3 is a side perspective view of the finished embodiment of the invention shown in FIG. 1 and FIG. 2.

After the composite skins (11) have been placed against the exterior surface of the freeform-fabricated core (10) and held there by the adhesive film (21), the composite skins (11) are cured to form a strong bond between the composite skins (11) and the freeform-fabricated core (10). The combination of the plurality of composite skins (11) being applied to the freeform-fabricated core (10) is called a "composite lay-up" (12) and the procedure for applying the composite skins (11) to the exterior surface of the freeform-fabricated core (8) is called the "lay-up". A vacuum bag assembly, where the vacuum bag assembly comprises a vacuum bag (22) and a vacuum pump (25), is disposed over the composite lay-up (12) forming a cavity between the vacuum bag (22) and the composite lay-up (12). As shown in FIG. 2, the vacuum pump (25) evacuates the cavity to urge the vacuum bag (22) against the plurality of composite skins (11) thereby compressing the composite skins (11) against the exterior surface structure of the freeform-fabricated core (10). The vacuum pressure is held on the vacuum bag. (22), preventing displacement of the composite skins (11) and removing excess binding matrix from the composite skins (11), until the freeform-fabricated core composite lay-up (12) has been cured. FIG. 3 shows the completed freeform-fabricated core composite article (8) ready for use. As an alternative, the vacuum bag assembly can also include a separator film (23) and a breather ply (24). When used, the separator film (23) and the breather ply (24) are disposed between the vacuum bag (22) and the composite lay-up (12).

By combining the improved fabrication materials, like improved resins, with the improved throughput speed of the freeform-fabrication machines, like the SLA7000, the potential exists (both economically and technically) for the first time to use a freeform-fabrication machine to produce usable end-use articles without the normal sacrificial production steps. The material properties of articles produced using SLS and FDM machines are improving as well. Moreover, their dimensional accuracy, finish quality and ability to reproduce small intricate features are expected to improve over the next few years to the extent that they too may be used successfully to produce freeform-fabricated core composite articles (8).

The following describes the best method to make freeform-fabricated core composite articles (8) described above:

1. Designing a freeform-fabricated core (10) for a freeform-fabricated core composite article (8) with a three-dimensional computer aided design (3D CAD) program to create a software file of a three-dimensional design generated by a computer of the freeform-fabricated core (10), the freeform-fabricated core (10) having a solid exterior surface structure and a solid interior structure. Any one of several commercially available 3D solid modeling programs may be used to design the freeform-fabricated core (10). The 3D CAD program allows the designer to develop a three-dimensional design generated by a computer of the freeform-fabricated core (10) that is dimensionally accurate.

Figure 4:
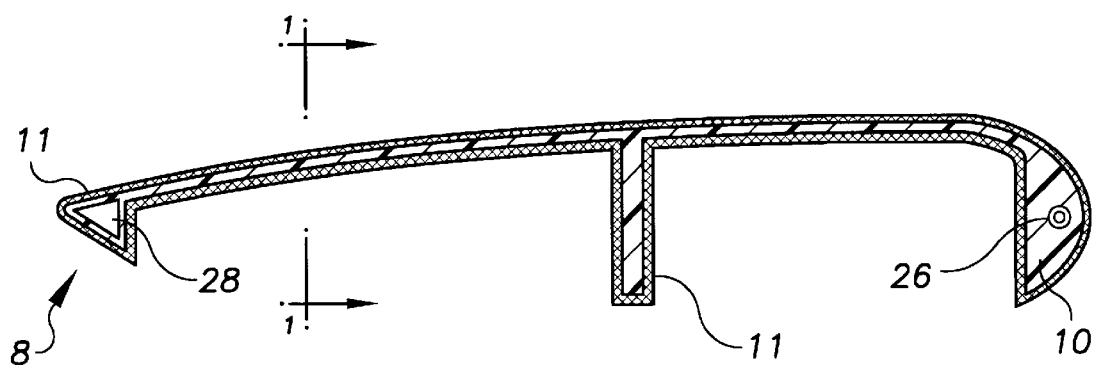
FIG. 4 is a cross-sectional view of another embodiment of the invention having a first conduit and a second conduit imbedded in the freeform-fabricated core of the invention.

2. Modifying the software file of the 3D CAD design of the freeform-fabricated core (10) to include a plurality of space for components, a plurality of components or other imbedded functionality within the freeform-fabricated core (10). As shown in FIG. 4, the freeform-fabricated core (10) has a first conduit (26), that has a round shape, and a second conduit (28), that has a triangular shape, imbedded in the interior structure. As an alternative, the designer can allow a space for a first conduit and a space for a second conduit where the first conduit (26) is received in the space for a first conduit and where the second conduit (28) is received in the space for a second conduit.

3. Modifying the software file of the 3D CAD design of the freeform-fabricated core (10) to allow for the plurality of composite skins (11) by reducing the exterior dimensions of the freeform-fabricated core (10) to compensate for the thickness of the composite skins (11) in order to obtain the desired dimension of the freeform-fabricated core composite article (8) after the composite skins (11) are attached to the freeform-fabricated core (10). The composite skins (11) may consist of one or more layers of fibrous material reinforced with polymer based binding matrix material.

4. Exporting the modified software file of the 3D CAD design of the freeform-fabricated core (10) into a machine language software file of the freeform-fabricated core (10) that is formatted to be used with a selected freeform-fabrication machine.

5. Importing the machine language software file of the design of the freeform-fabricated core (10) into a computer workstation, the computer workstation being of the type which produces control signals that control the selected freeform-fabrication machine, the freeform-fabrication machine having a build platform situated in a fabrication material storage area which holds fabrication material.

6. Processing the machine language software file of the freeform-fabricated core (10) by the computer workstation to create a freeform-fabrication software file that contains a plurality of contiguous planer cross-section layers of the freeform-fabricated core (10) along a Z-axis, where the Z-axis is the vertical axis of a three-dimensional Cartesian coordination system.

7. Selecting the desired orientation for fabricating the freeform-fabricated core (10) on the build platform in the selected freeform-fabrication machine.

8. Selecting the type and the spacing of support posts (not shown) as may be required to separate the freeform-fabricated core (10) from the freeform fabrication machine's build platform using the free-form fabrication software file. Support posts separate the freeform-fabricated core (10) from the build platform during the fabrication process.

9. Fabricating the freeform-fabricated core (10), with support posts as may be required, with the selected freeform-fabrication machine and the fabrication material from the free-form fabrication software file in the computer workstation such that the combination of the free-form fabrication software file, the computer workstation, the freeform-fabrication machine and the fabrication material cooperate to fabricate the freeform-fabricated core (10) on substantially a layer by layer basis on the build platform. The free-form fabrication machine that is recommended for the fabrication of the freeform-fabricated core (10) is the SLA7000 stereolithography apparatus, manufactured by 3D Systems, in order to obtain the highest quality of build accuracy and the highest speed of fabricating the freeform-fabricated core (10). The inventor recommends using Cibatool SL-7540 photocurable resins by Vantico Corporation (formerly Ciba Specialty Chemical) located in Glendale, Calif. in the SLA7000 as the fabrication material to be used to fabricate the freeform-fabricated core (10). Aternatively, 9120 photocurable resin by DSM Somos' SOMOS located in Wilmington, Del. may also be used in the SLA7000. If a freeform fabrication machine other than an SLA is used, care must be taken to select fabrication materials that have a melt or glass transition temperature of at least higher than the intended curing temperature for the freeform-fabricated core composite article. Otherwise, polymer matrix resins used in the process will be limited to those that are low temperature or air curable. The selection of fabrication materials may also be take into consideration as well as other physical property characteristics such as tensile strength, tensile modulus, elongation, impact strength and hardness. Upon the release of higher temperature phtotocurable resins or upon the release of polycarbonate physical property emulating resin for use in the SLA7000, the inventor recommends these materials be used in order to create the strongest freeform-fabricated composite core (10) possible. Other free-form fabrication equipment that may be used includes the DTM Sinterstation 2500Plus, the Cubital Solider 5600, Sanders Prototyper, the Stratasys FDM-8000 or the Z-402 from Z Corporation. While not recommended for economic and dimensional accuracy reasons, earlier generation SLA, SLS, and FDM machines may also be used. The recommended fabrication method for the freeform-fabricated core (10) of the SLA7000 stereolithography apparatus is an additive process that fabricates solid objects based upon a 3D CAD computer file input that has been modified and exported to the machine language software file input suitable for use with the SLA7000. The SLA7000 stereolithography apparatus utilizes a computer controlled solid-state UV laser to trace the pattern of the freeform-fabricated core (10), a sectional layer at a time, over a vat of photocurable resin that polymerizes or solidifies the polymer when the laser light contacts the polymer. A computer controlled elevator and re-coating system enables the laser to continually trace the pattern of the freeform-fabricated core (10) in the photocurable resin-filled vat, one sectional layer at a time until the completed freeform-fabricated core (10) and the support posts, if required, are formed.

10. Removing the freeform-fabricated core (10), with support posts as may be required, from the build platform in the selected freeform-fabrication machine.

11. Cleaning the freeform-fabricated core (10) with isopropyl alcohol or other solvent prescribed by the material supplier to remove any contaminants from the surface of the freeform-fabricated core (10).

12. Removing the support posts attached to the freeform-fabricated core (10) and discarding the support posts if used during the fabrication process.

13. Curing the freeform-fabricated core (10) using external stimulus to further solidify and harden the freeform-fabricated core (10). For example, if the SLA 7000 freeform-fabrication machine were used to fabricate the freeform-fabricated core (10), then one would use a 3D Systems Post Curing Apparatus (PCA) for the curing process. The PCA exposes the freeform-fabricated core (10) to intense ultraviolet light for a prescribed period, the duration of which varies depending upon fabrication material and the weight and size of the item, further solidifying and hardening the freeform-fabricated core (10). If a freeform fabrication machine other than a SLA is used, one would follow the selected freeform-fabrication machine manufacturer's recommended post fabrication curing instructions to provide the external stimulus to cure the freeform-fabricated core (10).

14. Finishing the surfaces of the cured freeform-fabricated core (10) by hand or machine filling, sanding and polishing to eliminate imperfections, blemishes or excess cured polymer.

15. Cutting, to appropriate length, the plurality of cured or uncured composite skins (11) into predetermined patterns to make a single or multi-layered composite skin (11) for the freeform-fabricated core composite article (8) to mate with the exterior surface structure of the freeform-fabricated core (10) in preparation for lay-up and bonding to the exterior surface structure of the freeform-fabricated core (10). As discussed above, the designer may choose from a wide range of composite skin (11) materials that are available in different widths, as well as direction of weave and density. When impregnated with liquid epoxy or vinyl ester resin, the composite skins (11) become very pliable and will conform to most curved surfaces and contours.

16. Impregnating the uncured composite skins (11) with the binding matrix. The inventor recommends a polymer based binding matrix such as epoxy, vinyl ester or other similar resinous organic material, per the designer's specifications. Metal binding matrix and ceramic binding matrix can be substituted for the polymer based binding matrix to provide more specialized composite systems called metal matrix composites and ceramic matrix composites, respectively. Alternatively, if pre-impregnated composite skins or cured composite skins (11) are used, then the user would follow the supplier's instructions to prepare the material for lay-up.

17. Applying a layer of adhesive film (21) between the exterior surface structure of the freeform-fabricated core (10) and the composite skins (11), if required. The adhesive film (21) holds the plurality of composite skins (11) to the exterior surface structure of the freeform-fabricated core (10) during the remaining fabrication process.

18. Mating part of the impregnated composite skins (11) to part of the freeform-fabricated core (10) to form a sub-assembly.

19. Mating the remaining impregnated composite skins (11) to the sub-assembly such that impregnated composite skins (11) are mated to each other and the freeform-fabricated core (10) to form a composite lay-up (12) of the freeform-fabricated core composite article (8).

20. Deposing a separator film (23) over the composite lay-up (12) forming a cavity between the separator film (23) and the composite lay-up (12).

21. Deposing a breather ply (24) over the separator film (23) forming a cavity between the breather ply (24) and the separator film (23).

22. Deposing a vacuum bag (22) over breather ply (24) forming a cavity between the vacuum bag (22) and the breather ply (24).

23. Evacuating the plurality of cavities, with vacuum pressure from a vacuum pump (25), to urge the vacuum bag (22) against the breather ply (24), thereby urging the breather ply (24) against the separator film (24), thereby urging the separator film (24) against the plurality of composite skins (11), thereby compressing the impregnated composite skin (11) against the exterior surface of the freeform-fabricated core (10) to prevent displacement of the composite skins (11) and remove excess binding matrix from the composite skins (11). Excess liquid binding matrix is wicked away from the lay-up by the breather ply (24), thereby reducing the weight of the completed freeform-fabricated core composite article (8) and reducing the amount of finishing work required on the completed freeform-fabricated core composite article (8). The separator film (23) will allow easy separation of the vacuum bagging material (22) and the freeform-fabricated core composite article (8) after curing the composite lay-up (12).

24. Curing the composite lay-up (12) wherein the composite lay-up (12) is subjected to external stimulus that solidifies and hardens the composite lay-up (12) forming a cured composite lay-up (12). Where recommended materials have been used, any one of several conventional heat or heat/pressure curing methods may be used to cure the composite lay-up (12). Most commonly, an industrial autoclave is used to heat cure the composite lay-up (12) prior to finishing. However, an industrial oven, ambient air curing, or heat lamp system may be used depending upon the article's intended use and the type of fibrous material employed to make the composite skins (11).

25. Removing the cured composite lay-up (12), wrapped in the breather ply (24) and separator film (23), from the vacuum bag (22).

26. Removing the cured composite lay-up (12), wrapped in the separator film (23), from the breather ply (24).

27. Removing the cured composite lay-up (12) from the separator film (23).

28. Finishing the cured composite lay-up (12) to form the freeform-fabricated core composite article (8). Depending upon the composite materials selected, the item may require the use of fillers and sanding to obtain desired smoothness. Unlike composites made from molds or sculpted foam cores, this invention reduces much of the need for filling and sanding due to imperfections in the mold or sculpted foam core.

Figure 6:
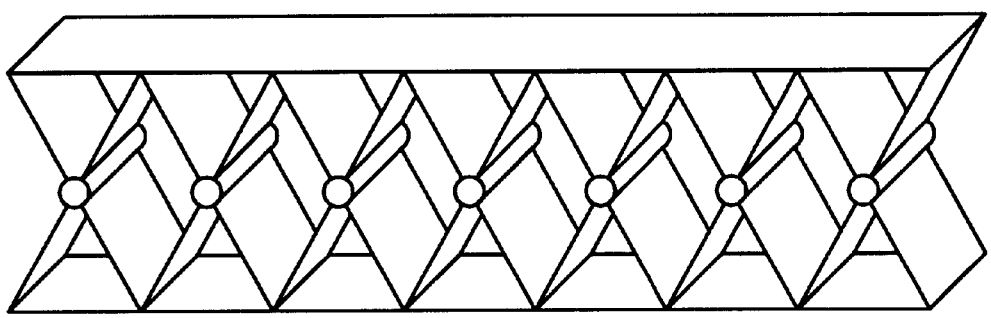
FIG. 6 is a partial cross-sectional perspective view of an isosceles triangular pattern tensegrity structure used in the interior of the freeform-fabricated core.
Figure 7:
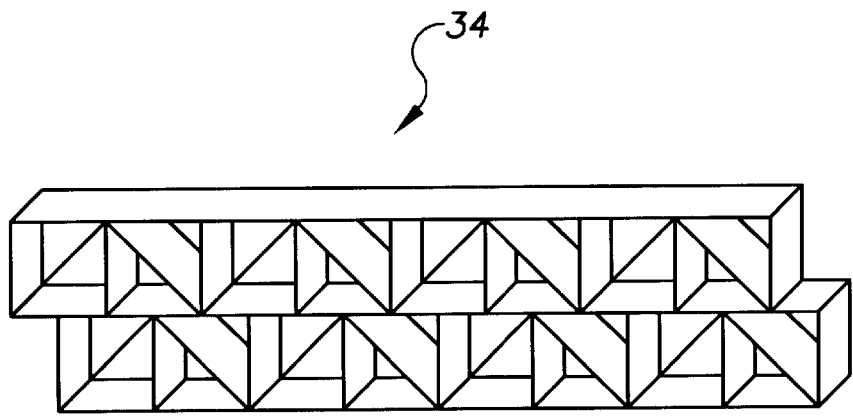
FIG. 7 is a partial cross-sectional perspective view of a right triangular pattern tensegrity structure used in the interior of the freeform-fabricated core.
Figure 8:
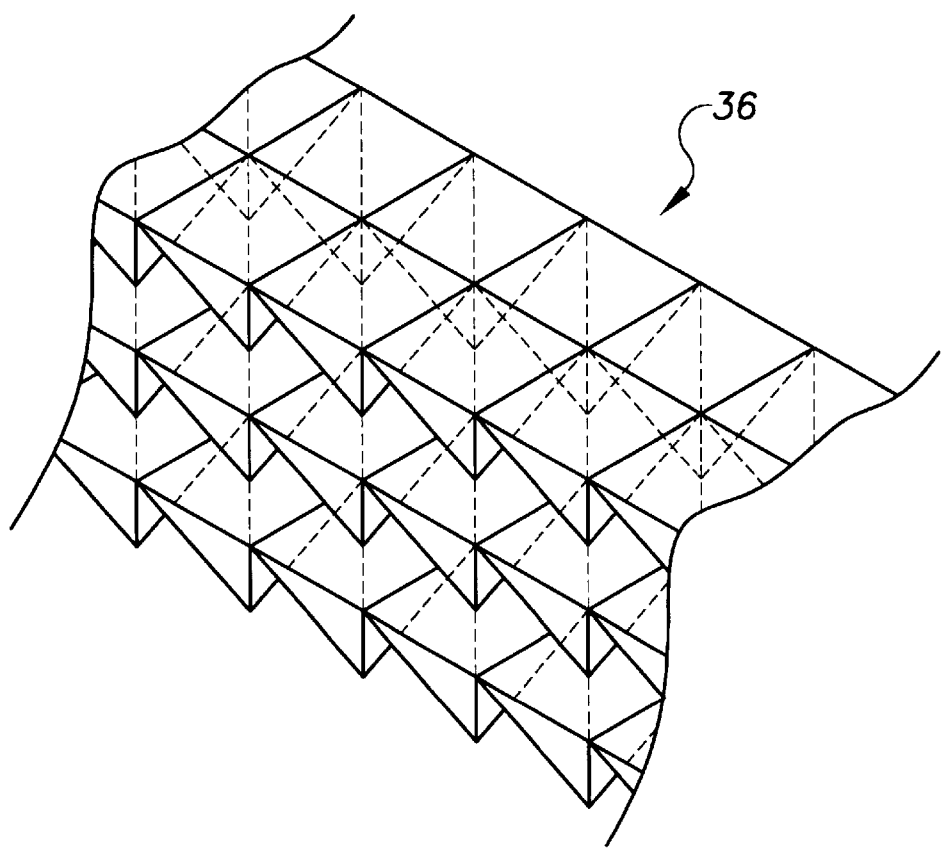
FIG. 8 is a partial cross-sectional perspective view of a geodesic pattern tensegrity structure used in the interior of the freeform-fabricated core.
Figure 9:
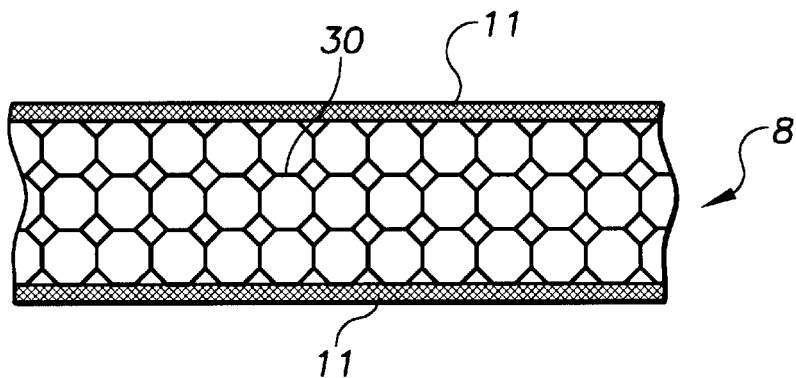
FIG. 9 is a partial sectional view of the invention taken along the line 1—1 of FIG. 4 that shows an alternative embodiment using a honeycomb pattern structure as the interior structure of the freeform-fabricated core.

In another embodiment of the invention, an additional step can be added between Step 1 and Step 2 above, where the software file of the 3D CAD design is modified to convert the design of the internal structure of the freeform-fabricated core (10) from a solid to any desired internal non-solid structural pattern. For example, FIG. 9 shows the invention having a honeycomb pattern structure (30) as its internal structural design. In aerospace applications that require high strength to weight ratios, the objective is to lighten the freeform-fabricated core (10) as much as possible while maintaining sufficient structural integrity to keep its shape during subsequent manufacturing steps and add compressive strength to the completed article. Any internal non-solid structure employing thin support walls (38) or trusses may be used to achieve this objective. FIG. 5 shows an example of a honeycomb pattern structure (30). FIG. 6 shows an example of an isosceles triangular pattern tensegrity structure (32). FIG. 7 shows an example of a right triangular pattern tensegrity structure (34). FIG. 8 shows an example of a geodesic pattern tensegrity structure (36). Tensegrity structures are unique in that they are able to distribute both tensional and compressive forces in such a way that when an external force is applied in one area, it is continuously transmitted across all the members of the structure. While tensegrity type patterns are superior to non-tensegrity capable structures and thus advisable for use within a freeform-fabricated composite core, they are more complex to manufacture. Fortunately, by using a freeform fabrication machine, tensegrity patterns are no more difficult or costly to fabricate than a non-tensegrity structural pattern. The dimensions, orientation and geometric structure of the thin support walls (38) or trusses comprising the structure can be selected to create the desired rigidity or flexibility for the item or segment of the item. Using the freeform-fabrication technology, the designer may alter the geometric shape, pattern, or orientation of the thin support walls (38) or trusses, and the dimensional size and density of the structural pattern throughout the freeform-fabricated core (10) to achieve the desired physical properties. This affords the designer the opportunity to match or compliment the desired physical properties of the composite materials that will be applied later. While small items may be economically produced using a solid structure, larger composite articles are better served when a non-solid structural design is used. A non-solid structure such as one composed of thin diameter trusses arranged in a tensegrity pattern that uses less material and requires less freeform fabrication machine time to produce than a solid structure.

By making use of tensegrity structures combined with the unique production abilities of freeform-fabrication machines, it is possible to cost effectively produce composite articles with potentially much greater strength to weight ratios than are currently produced today. Moreover, the internal geometric patterns used can vary from one part to another in the article in terms of type and density to provide the designer almost unlimited freedom to engineer desired flexibility, stiffness and shear strength wherever they are needed. Using the freeform-fabricated core composite article process, designers will also be able to select from a wide-variety of tensegrity and non-tensegrity structural designs consisting of thin-walled and truss patterns. Triangles, pyramids, polygons and geodesic spheres represent only a few of the many possible geometric shapes that are possible. Using this new method of manufacturing composite articles (8), the designer can select an interior structure for the freeform-fabricated core (10) that provides higher compressive reinforcement, therefore the need to have multi-layers of composite skins (11) is greatly reduced and will allow the designer to consider using fewer layers of composite skins (11) for the freeform-fabricated core composite article (8).

Figure 10:
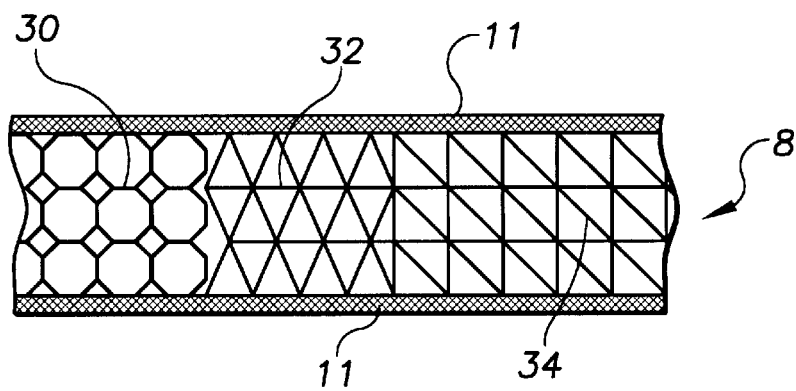
FIG. 10 is a partial sectional view of the invention taken along the line 1—1 of FIG. 4 that shows a second alternative embodiment using a combination of a honeycomb pattern structure, an isosceles triangular pattern tensegrity structure, and a right triangular pattern tensegrity structure as the interior structure of the freeform-fabricated core.

As shown in FIG. 10, another embodiment of the invention has a combination of different internal structural patterns, such as a honeycomb pattern structure (30), an isosceles triangular pattern tensegrity structure (32), and a right triangular pattern tensegrity structure (34), being used in the same freeform-fabricated core (10). This allows the designer to select different internal structures to respond to requirements for differences in physical strength and flexibility throughout the freeform-fabricated core (10).

Figure 11:
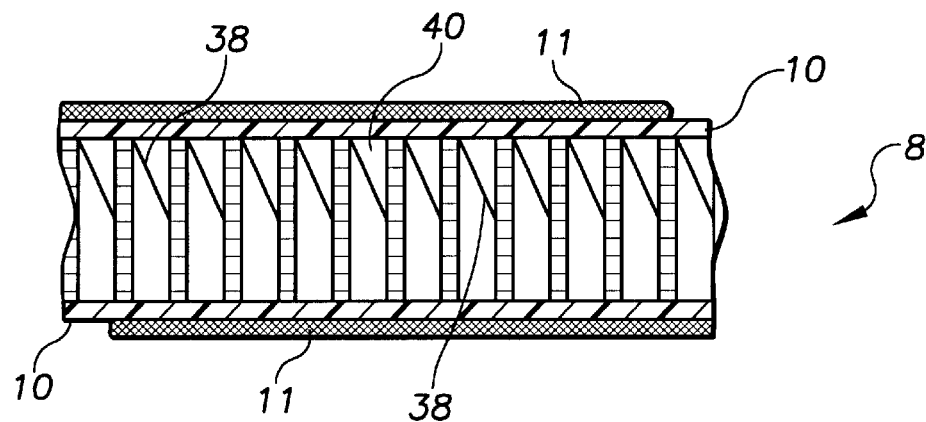
FIG. 11 is a partial sectional view of the invention taken along the line 1—1 of FIG. 4 that shows a third alternative embodiment using a thin wall support in a triangular pattern tensegrity structure that is stacked in offset layers so that the voids are in communication with one another throughout the interior structure of the freeform-fabricated core.
Figure 12:
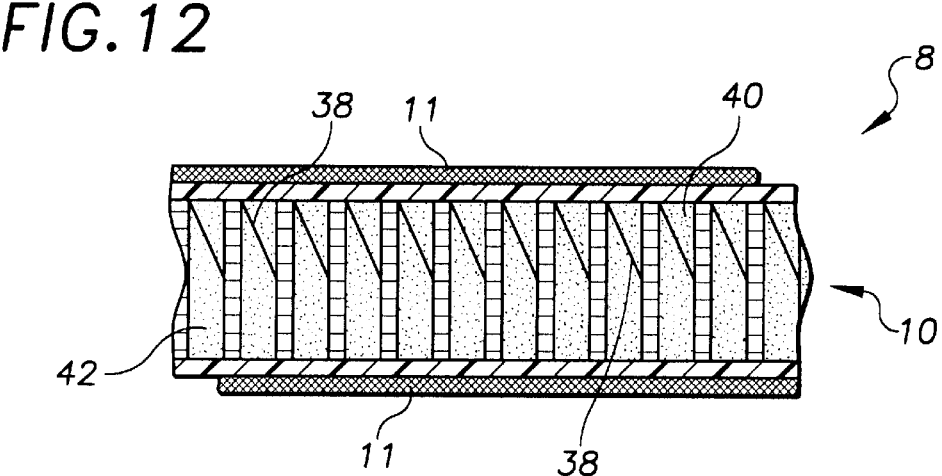
FIG. 12 is a partial sectional view of the invention taken along the line 1—1 of FIG. 4 that shows another alternative embodiment using a thin wall support in a triangular pattern tensegrity structure that is stacked in offset layers so that the voids are in communication with one another throughout the interior structure of the freeform-fabricated core to allow glass beads in epoxy matrix, polyurethane foams or other materials to be received into the voids.

In yet another embodiment of the invention, as shown in FIG. 11, the interior structural pattern may be designed with thin support walls (38) or trusses that are arranged triangularly and stacked in offset layers so that the voids (40) are in communication with one another throughout the freeform-fabricated core (10). The interconnecting communication between the voids (40) will provide for thorough draining of the uncured photcurable resin from the freeform-fabricated core (10) without compromising desired physical properties. As shown in FIG. 12, the voids (40) also allow a vacuum to be created within the entire structure of the freeform-fabricated core (10), making it possible to effectively infiltrate the structure with a powdered or viscous reinforcing substance (42) or other desired material such as glass beads in epoxy binding matrix, polyurethane foam or carbon based materials in a polymer based binding matrix. This option is of particular interest in certain military and commercial aerospace applications.

FIG. 4 shows another embodiment of the freeform-fabricated core composite article (8) where the software file of the 3D CAD design, in Step 1. above, can be modified to include a first conduit (26) and a second conduit (28) imbedded in the freeform-fabricated core (10). The first conduit (26) and the second conduit (28) can be used to contain liquids or to receive mechanical devices such as rods or electrical devices such as electrical wire or electrical cables. The shape of the first conduit (26) and the second conduit (28) can be of any shape required to accommodate the shape of the freeform-fabricated core (10) and to accommodate the items placed through them. The freeform-fabricated core (10) can be designed to accommodate other components, a space for a component or other imbedded functionality with the freeform-fabricated core (10). For example, the designer can provide a space for the first conduit and a space for the second conduit such that the first conduit (26) and the second conduit (28) can be installed after the freeform-fabricated core composite article (8) has been manufactured.

Figure 13:
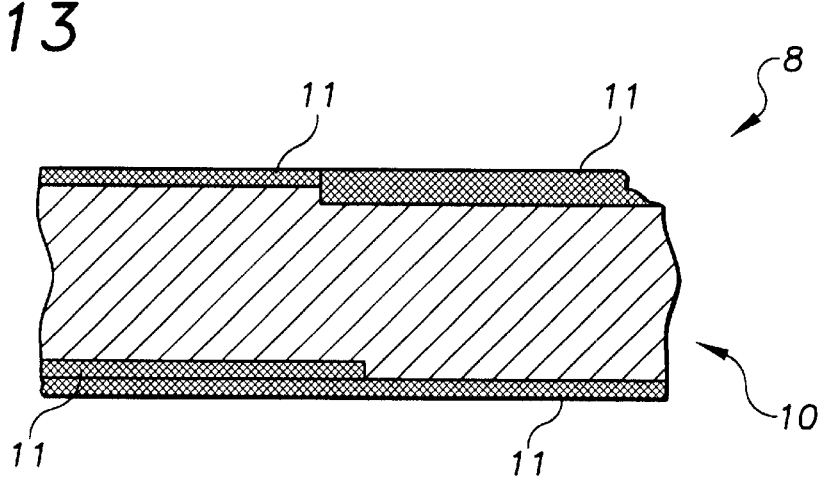
FIG. 13 is a partial sectional view of the invention taken along the line 1—1 of FIG. 4 that shows a ridge in the freeform-fabricated core with a solid interior structure to provide for different thicknesses of the composite skins or for multiple layers of the composite skins.

As shown in FIG. 13, in another embodiment of the invention, the software file of the 3D CAD design of the freeform-fabricated core (10) can be modified, in step 3. above, to allow one thickness or a number of layers of composite skins (11) for a predetermined region of the composite lay-up (12) and for another thickness or number of layers of composite skins (11) for a different predetermined region of the composite lay-up (12); or to allow for multiple layers of the composite skins (11) in different weave direction orientations. In the event the designer chooses to butt together the composite skins (11) of different thickness or the composite skins (11) differing in the number of layers, the need for filling and sanding can be avoided by adjusting the software file of the 3D CAD design of the freeform-fabricated core (10) to create a ridge in the freeform-fabricated core (10) pre-marking the boundary line between the two regions.

In yet another embodiment of the invention, as shown in FIG. 14, an additional step can be added to the method of manufacture, after Step 12., when the freeform-fabricated core design requires a freeform-fabricated core (10) that is larger than the free-form fabrication machine's build envelope (i.e.: the SLA7000 maximum build envelope is x-20", y-20", z-23.6"). In these situations, the freeform-fabricated core design file is cut into freeform-fabricated core segments (14) to fit the build envelope. An EFOS UV Light Gun is used in conjunction with photocurable resin as a bonding agent to join the freeform-fabricated core segments (14) at a core joint (44) to form the whole freeform-fabricated core (10). Freeform-fabricated cores (10) made from freeform-fabricated core segments (14) that are joined using this procedure are virtually seamless with little strength sacrificed. To ensure proper alignment during the segment joining process, the freeform-fabricated core may be designed to integrate any number of types of joining structures (i.e.: butt, dove tail, mortise and tenon).

Although particular embodiments of the invention have been described and illustrated herein, it is recognized that modifications and variations may readily occur to those skilled in the art and consequently it is intended to cover such modifications and equivalents.

What is claimed is:

1. A method for creating a freeform-fabricated core composite article comprising the steps of:
    a. creating a freeform-fabricated core having an exterior surface structure and an interior structure from freeform material, said freeform material being a material having a transition temperature of at least higher than the intended curing temperature of the freeform-fabricated core article, said interior structure having at least one structural pattern located therein, with a freeform-fabrication machine from a three-dimensional design generated by a computer of the freeform-fabricated core, wherein the freeform-fabricated core is dimensionally accurate;
    b. preparing a plurality of composite skins for mating with the exterior surface structure of the freeform-fabricated core;
    c. mating the plurality of composite skins to the exterior surface structure of the freeform-fabricated core forming a composite lay-up;
    d. disposing a vacuum bag over the composite lay-up forming a cavity between the vacuum bag and the composite lay-up;
    e. evacuating the cavity to urge the vacuum bag against the plurality of composite skins thereby compressing the plurality of composite skins against the exterior surface structure of the freeform-fabricated core preventing displacement of the composite skins; and
    f. curing the composite lay-up to form the freeform-fabricated core composite article.

2. The method as recited in claim 1 in which the interior structure of the freeform-fabricated core comprises a solid interior structure.

3. The method as recited in claim 1 in which the interior structure of the freeform-fabricated core comprises a non-solid interior structure.

4. The method as recited in claim 1 in which the interior structure of the freeform-fabricated core comprises a combination of a solid interior structure and a non-solid interior structure.

5. The method as recited in claim 1 in which the interior structure of the freeform-fabricated core comprises a plurality of non-solid interior structures.

6. The method as recited in claim 1 in which the interior structure of the freeform-fabricated core comprises non-solid interior structures having a network of interconnected support walls defining the shape of the freeform-fabricated core composite article and leaving voids between the support members and is further characterized by infiltrating the voids with a reinforcing substance.

7. The method of claim 6 in which the reinforcing substance comprises glass beads in a binding matrix.

8. The method of claim 6 in which the reinforcing substance comprises carbon based material in a binding matrix.

9. The method of claim 1 further characterized by modifying the three-dimensional design generated by a computer of the freeform-fabricated core to incorporate a plurality of imbedded functionality within the interior structure of the freeform-fabricated core.

10. The method of claim 9 in which the plurality of imbedded functionality within the interior structure of the freeform-fabricated core comprises a plurality of space for components within the interior structure and is further characterized by adding a plurality of components where the plurality of components are received by the plurality of space for components in the interior structure.

11. The method in claim 10 in which the plurality of space for components within the interior structure comprises a space for the first conduit and a space for the second conduit, and the plurality of components comprises a first conduit and a second conduit, where the first conduit is received in the space for the first conduit and the second conduit is received in the space for the second conduit.

12. The method of claim 1 in which the freeform-fabricated core further comprises a plurality of freeform-fabricated core segments, the plurality of freeform-fabricated core segments are joined together at core joints, wherein the joined freeform-fabricated core segments form the freeform-fabricated core.

13. The method as recited in claim 12 in which the interior structure of the freeform-fabricated core comprises a solid interior structure.

14. The method as recited in claim 12 in which the interior structure of the freeform-fabricated core comprises a non-solid interior structure.

15. The method as recited in claim 12 in which the interior structure of the freeform-fabricated core comprises a combination of a solid interior structure and a non-solid interior structure.

16. The method as recited in claim 12 in which the interior structure of the freeform-fabricated core comprises a plurality of non-solid interior structures.

17. The method as recited in claim 12 in which the interior structure of the freeform-fabricated core comprises non-solid interior structures having a network of interconnected support walls defining the shape of the freeform-fabricated core composite article and leaving voids between the support members and is further characterized by infiltrating the voids with a reinforcing substance.

18. The method of claim 17 in which the reinforcing substance comprises glass beads in a binding matrix.

19. The method of claim 17 in which the reinforcing substance comprises carbon based material in a binding matrix.

20. The method of claim 12 further characterized by modifying the three-dimensional design generated by a computer of the freeform-fabricated core to incorporate a plurality of imbedded functionality within the interior structure of the freeform-fabricated core.

21. The method of claim 20 in which the plurality of imbedded functionality within the interior structure of the freeform-fabricated core comprises a plurality of space for components within the interior structure and is further characterized by adding a plurality of components where the plurality of components are received by the plurality of space for components in the interior structure.

22. The method in claim 21 in which the plurality of space for components within the interior structure comprises a space for the first conduit and a space for the second conduit, and the plurality of components comprises a first conduit and a second conduit, where the first conduit is received in the space for the first conduit and the second conduit is received in the space for the second conduit.

23. A method for creating a freeform-fabricated core composite article comprising the steps of:

a. designing a freeform-fabricated core having an exterior surface structure and an interior structure from freeform material, said freeform material being a material having a transition temperature of at least higher than the intended curing temperature of the freeform-fabricated core article, said interior structure having at least one structural pattern located therein, for the freeform-fabricated core composite article for fabrication with a freeform-fabrication machine, with a three-dimensional design generated by a computer of the freeform-fabricated core, wherein the three-dimensional design generated by a computer of the freeform-fabricated core is dimensionally accurate;

b. fabricating the freeform-fabricated core with the freeform-fabrication machine and the fabrication material from the three-dimensional design generated by a computer of the freeform-fabricated core such that the freeform fabrication machine cooperates with the fabrication material to fabricate the freeform-fabricated core on substantially a layer by layer basis;

c. preparing the fabricated freeform-fabricated core for mating with a plurality of composite skins;

d. preparing the plurality of composite skins for mating with the exterior surface of the freeform-fabricated core, the plurality of composite skins comprises fibrous reinforcement material disposed in a binding matrix;

e. mating the plurality of composite skins to the exterior surface structure of the freeform-fabricated core forming a composite lay-up;

f. disposing a vacuum bag over the composite lay-up forming a cavity between the vacuum bag and the composite lay-up;

g. evacuating the cavity to urge the vacuum bag against the plurality of composite skins thereby compressing the plurality of composite skins against the exterior surface structure of the freeform-fabricated core preventing displacement of the plurality of composite skins and removing excess binding matrix from the plurality of composite skins; and h. curing the composite lay-up to form the freeform-fabricated core composite article.

24. The method of claim 23 further including the step of applying adhesive film between the exterior surface structure of the freeform-fabricated core and the plurality of composite skins.

25. The method as recited in claim 23 in which the interior structure of the freeform-fabricated core comprises a solid interior structure.

26. The method as recited in claim 23 in which the interior structure of the freeform-fabricated core comprises a non-solid interior structure.

27. The method as recited in claim 23 in which the interior structure of the freeform-fabricated core comprises a combination of a solid interior structure and a non-solid interior structure.

28. The method as recited in claim 23 in which the interior structure of the freeform-fabricated core comprises a plurality of non-solid interior structures.

29. The method as recited in claim 23 in which the interior structure of the freeform-fabricated core comprises non-solid interior structures having a network of interconnected support walls defining the shape of the freeform-fabricated core composite article and leaving voids between the support members and is further characterized by infiltrating the voids with a reinforcing substance.

30. The method of claim 29 in which the reinforcing substance comprises glass beads in a binding matrix.

31. The method of claim 29 in which the reinforcing substance comprises carbon based material in a binding matrix.

32. The method of claim 23 further characterized by modifying the three-dimensional design generated by a computer of the freeform-fabricated core to incorporate a plurality of imbedded functionality within the interior structure of the freeform-fabricated core.

33. The method of claim 32 in which the plurality of imbedded functionality within the interior structure of the freeform-fabricated core comprises a plurality of space for components within the interior structure and is further characterized by adding a plurality of components where the plurality of components are received by the plurality of space for components in the interior structure.

34. The method in claim 33 in which the plurality of space for components within the interior structure comprises a space for the first conduit and a space for the second conduit, and the plurality of components comprises a first conduit and a second conduit, where the first conduit is received in the space for the first conduit and the second conduit is received in the space for the second conduit.

35. The method of claim 23 in which the freeform-fabricated core further comprises a plurality of freeform-fabricated core segments, the plurality of freeform-fabricated core segments are joined together at core joints with fabrication material, wherein the joined freeform-fabricated core segments form the freeform-fabricated core.

36. The method as recited in claim 35 in which the interior structure of the freeform-fabricated core comprises a solid interior structure.

37. The method as recited in claim 35 in which the interior structure of the freeform-fabricated core comprises a non-solid interior structure.

38. The method as recited in claim 35 in which the interior structure of the freeform-fabricated core comprises a combination of a solid interior structure and a non-solid interior structure.

39. The method as recited in claim 35 in which the interior structure of the freeform-fabricated core comprises a plurality of non-solid interior structures.

40. The method as recited in claim 35 in which the interior structure of the freeform-fabricated core comprises non-solid interior structures having a network of interconnected support walls defining the shape of the freeform-fabricated core composite article and leaving voids between the support members and is further characterized by infiltrating the voids with a reinforcing substance.

41. The method of claim 40 in which the reinforcing substance comprises glass beads in a binding matrix.

42. The method of claim 40 in which the reinforcing substance comprises carbon based material in a binding matrix.

43. The method of claim 35 further characterized by modifying the three-dimensional design generated by a computer of the freeform-fabricated core to incorporate a plurality of imbedded functionality within the interior structure of the freeform-fabricated core.

44. The method of claim 43 in which the plurality of imbedded functionality within the interior structure of the freeform-fabricated core comprises a plurality of space for components within the interior structure and is further characterized by adding a plurality of components where the plurality of components are received by the plurality of space for components in the interior structure.

45. The method in claim 44 in which the plurality of space for components within the interior structure comprises a space for the first conduit and a space for the second conduit, and the plurality of components comprises a first conduit and a second conduit, where the first conduit is received in the space for the first conduit and the second conduit is received in the space for the second conduit.

46. The method in claim 23 further including a step modifying the three-dimensional design generated by a computer of the freeform-fabricated core to allow for the plurality of composite skins to be attached to the exterior surface structure of the freeform-fabricated core by reducing the exterior dimensions of the freeform-fabricated core to compensate for the thickness of the plurality of composite skins such that the freeform-fabricated core and the plurality of composite skins cooperate to provide the desired exterior dimension of the freeform-fabricated core composite article.

47. The method of claim 46 is further characterized by adding a plurality of ridges in the exterior surface structure of the freeform-fabricated core to cooperate with the plurality of composite skins having a predetermined number of layers in a predetermined region of the freeform-fabricated core composite article and to cooperate with the plurality of composite skins having a different predetermined number of layers in a different predetermined region of the freeform-fabricated core composite article to compensate for the thickness of the plurality of composite skins thereby providing the desired exterior dimension of the freeform-fabricated core composite article where the ridges form the boundaries between the regions.

48. The method of claim 46 is further characterized by adding a plurality of ridges in the exterior surface structure to cooperate with the plurality of composite skins having a predetermined thickness in a predetermined region of the freeform-fabricated core composite article and to cooperate with the plurality of composite skins having a different predetermined thickness in a different predetermined region of the freeform-fabricated core composite article to compensate for the thickness of the plurality of composite skins thereby providing the desired exterior dimension of the freeform-fabricated core composite article where the ridges form the boundaries between the regions.

49. A method for creating a freeform-fabricated core composite article comprising the steps of:

a. designing a freeform-fabricated core having an exterior surface structure and an interior structure from freeform material, said freeform material being a material having a transition temperature of at least higher than the intended curing temperature of the freeform-fabricated core article, said interior structure having at least one structural pattern located therein, for the freeform-fabricated core composite article with a three-dimensional computer aided design program to create a software file of a three-dimensional design generated by a computer of the freeform-fabricated core, wherein the three-dimensional design generated by a computer of the freeform-fabricated core is dimensionally accurate;

b. modifying the software file of the three-dimensional design generated by a computer of the freeform-fabricated core to allow for a plurality of composite skins to be attached to the exterior surface structure of the freeform-fabricated core by reducing the exterior dimensions of the freeform-fabricated core to compensate for the thickness of the plurality of composite skins such that the freeform-fabricated core and the plurality of composite skins cooperate to provide the desired exterior dimension of the freeform-fabricated core composite article;

c. exporting the modified software file of the three-dimensional design generated by a computer of the freeform-fabricated core into a machine language software file of the freeform-fabricated core;

d. importing the machine language software file of the freeform-fabricated core into a computer workstation, the computer workstation being of the type which produces control signals that control a freeform fabrication machine, the freeform fabrication machine having a build platform situated in a fabrication material storage area which holds fabrication material, the fabrication material being capable of cooperating with the freeform-fabrication machine to fabricate the freeform-fabricated core;

e. processing the machine language software file of the freeform-fabricated core by the computer workstation to create a freeform fabrication software file that contains a plurality of contiguous planar cross-sectional layers of the freeform-fabricated core to allow the freeform-fabricated core to be fabricated by the freeform fabrication machine on substantially a layer by layer basis;

f. fabricating the freeform-fabricated core with the freeform-fabrication machine and fabrication material from the freeform-fabrication software file in the computer workstation such that the combination of the freeform-fabrication software file, the computer workstation, the freeform-fabrication machine and the fabrication material cooperate to fabricate the freeform-fabricated core on substantially a layer by layer basis on the build platform;

g. removing the fabricated freeform-fabricated core from the build platform of the freeform-fabrication machine;

h. cleaning the freeform-fabricated core to remove any contaminants and any sacrificial build support material that may exist from the freeform-fabricated core;

i. curing the freeform-fabricated core;

j. finishing the cured freeform-fabricated core, wherein the imperfections, blemishes or excess cured fabrication material are eliminated from the freeform-fabricated core;

k. cutting the plurality of composite skins into a predetermined pattern wherein the pattern of the plurality of composite skins mates with the exterior surface structure of the freeform-fabricated core, the plurality of composite skins comprises fibrous reinforcement material disposed in a binding matrix;

l. mating the plurality of composite skins to the exterior surface structure of the freeform-fabricated core forming a composite lay-up;

m. disposing a vacuum bag assembly over the composite lay-up, the vacuum bag assembly comprising a vacuum bag, a separator film, a breather ply, and a vacuum pump where the separator film is disposed over the composite lay-up, the breather ply is disposed over the separator film, and the vacuum bag is disposed over the breather ply forming a plurality of cavities between the vacuum bag and the composite lay-up;

n. evacuating the plurality of cavities between the vacuum bag and the composite lay-up with the vacuum pump to urge the vacuum bag against the breather ply, to urge the breather ply against the separator film, to urge the separator film against the plurality of composite skins thereby compressing the plurality of composite skins against the exterior surface structure of the freeform-fabricated core preventing displacement of the plurality of composite skins and removing excess binding matrix from the plurality of composite skins;

o. curing the composite lay-up, wherein the composite lay-up is subjected to external stimulus that solidifies and hardens the composite lay-up forming a cured composite lay-up; and p. finishing the cured composite lay-up, wherein the imperfections, blemishes or excess cured binding matrix are eliminated from the cured composite lay-up forming the freeform-fabricated core composite article.

50. The method as recited in claim 49 in which the interior structure of the freeform-fabricated core comprises a solid interior structure.

51. The method as recited in claim 49 in which the interior structure of the freeform-fabricated core comprises a non-solid interior structure.

52. The method as recited in claim 49 in which the interior structure of the freeform-fabricated core comprises a combination of a solid interior structure and a non-solid interior structure.

53. The method as recited in claim 49 in which the interior structure of the freeform-fabricated core comprises a plurality of non-solid interior structures.

54. The method as recited in claim 49 in which the interior structure of the freeform-fabricated core comprises non-solid interior structures having a network of interconnected support walls defining the shape of the freeform-fabricated core composite article and leaving voids between the support members and is further characterized by infiltrating the voids with a reinforcing substance.

55. The method of claim 49 further characterized by modifying the software file of the three-dimensional design generated by a computer of the freeform-fabricated core to incorporate a plurality of imbedded functionality within the interior structure of the freeform-fabricated core.

56. The method of claim 55 in which the plurality of imbedded functionality within the interior structure of the freeform-fabricated core comprises a plurality of space for components within the interior structure and is further characterized by adding a plurality of components where the plurality of components are received by the plurality of space for components in the interior structure.

57. The method in claim 56 in which the plurality of space for components within the interior structure comprises a space for the first conduit and a space for the second conduit, and the plurality of components comprises a first conduit and a second conduit, where the first conduit is received in the space for the first conduit and the second conduit is received in the space for the second conduit.

58. The method of claim 49 is further characterized by modifying the software file of the three-dimensional design generated by a computer of the freeform-fabricated core to incorporate a plurality of ridges in the exterior surface structure such that the exterior surface structure cooperates with the plurality of composite skins having a predetermined number of layers in a predetermined region of the freeform-fabricated core composite article and cooperates with the plurality of composite skins having a different predetermined number of layers in a different predetermined region of the freeform-fabricated core composite article to compensate for the thickness of the plurality of composite skins thereby providing the desired exterior dimension of the freeform-fabricated core composite article where the ridges form the boundaries between the regions.

59. The method of claim 49 is further characterized by modifying the software file of the three-dimensional design generated by a computer of the freeform-fabricated core to incorporate a plurality of ridges in the exterior surface structure such that the exterior surface structure cooperates with the plurality of composite skins having a predetermined thickness in a predetermined region of the freeform-fabricated core composite article and cooperates with the plurality of composite skins having a different predetermined thickness in a different predetermined region of the freeform-fabricated core composite article to compensate for the thickness of the plurality, of composite skins thereby providing the desired exterior dimension of the freeform-fabricated core composite article where the ridges form the boundaries between the regions.

60. The method of claim 49 in which the freeform-fabricated core further comprises a plurality of freeform-fabricated core segments, the plurality of freeform-fabricated core segments are joined together at core joints with fabrication material, wherein the joined freeform-fabricated core segments form the freeform-fabricated core.

61. The method as recited in claim 60 in which the interior structure of the freeform-fabricated core comprises a solid interior structure.

62. The method as recited in claim 60 in which the interior structure of the freeform-fabricated core comprises a non-solid interior structure.

63. The method as recited in claim 60 in which the interior structure of the freeform-fabricated core comprises a combination of a solid interior structure and a non-solid interior structure.

64. The method as recited in claim 60 in which the interior structure of the freeform-fabricated core comprises a plurality of non-solid interior structures.

65. The method as recited in claim 60 in which the interior structure of the freeform-fabricated core comprises non-solid interior structures having a network of interconnected support walls defining the shape of the freeform-fabricated core composite article and leaving voids between the support members and is further characterized by infiltrating the voids with a reinforcing substance.

66. The method of claim 60 further characterized by modifying the software file of the three-dimensional design generated by a computer of the freeform-fabricated core to incorporate a plurality of imbedded functionality within the interior structure of the freeform-fabricated core.

67. The method of claim 66 in which the plurality of imbedded functionality within the interior structure of the freeform-fabricated core comprises a plurality of space for components within the interior structure and is further characterized by adding a plurality of components where the plurality of components are received by the plurality of space for components in the interior structure.

68. The method in claim 67 in which the plurality of space for components within the interior structure comprises a space for the first conduit and a space for the second conduit, and the plurality of components comprises a first conduit and a second conduit, where the first conduit is received in the space for the first conduit and the second conduit is received in the space for the second conduit.

69. The method of claim 60 is further characterized by modifying the software file of the three-dimensional design generated by a computer of the freeform-fabricated core to incorporate a plurality of ridges in the exterior surface structure such that the exterior surface structure cooperates with the plurality of composite skins having a predetermined number of layers in a predetermined region of the freeform-fabricated core composite article and cooperates with the plurality of composite skins having a different predetermined number of layers in a different predetermined region of the freeform-fabricated core composite article to compensate for the thickness of the plurality of composite skins thereby providing the desired exterior dimension of the freeform-fabricated core composite article where the ridges form the boundaries between the regions.

70. The method of claim 60 is further characterized by modifying the software file of the three-dimensional design generated by a computer of the freeform-fabricated core to incorporate a plurality of ridges in the exterior surface structure such that the exterior surface structure cooperates with the plurality of composite skins having a predetermined thickness in a predetermined region of the freeform-fabricated core composite article and cooperates with the plurality of composite skins having a different predetermined thickness in a different predetermined region of the freeform-fabricated core composite article to compensate for the thickness of the plurality of composite skins thereby providing the desired exterior dimension of the freeform-fabricated core composite article where the ridges form the boundaries between the regions.

71. The method of claim 49 further including the step of applying an adhesive film between the exterior surface structure of the freeform-fabricated core and the plurality of composite skins.

72. The method as recited in claim 71 in which the interior structure of the freeform-fabricated core comprises a solid interior structure.

73. The method as recited in claim 71 in which the interior structure of the freeform-fabricated core comprises a non-solid interior structure.

74. The method as recited in claim 71 in which the interior structure of the freeform-fabricated core comprises a combination of a solid interior structure and a non-solid interior structure.

75. The method as recited in claim 71 in which the interior structure of the freeform-fabricated core comprises a plurality of non-solid interior structures.

76. The method as recited in claim 71 in which the interior structure of the freeform-fabricated core comprises non-solid interior structures having a network of interconnected support walls defining the shape of the freeform-fabricated core composite article and leaving voids between the support members and is further characterized by infiltrating the voids with a reinforcing substance.

77. The method of claim 71 further characterized by modifying the software file of the three-dimensional design generated by a computer of the freeform-fabricated core to incorporate a plurality of imbedded functionality within the interior structure of the freeform-fabricated core.

78. The method of claim 77 in which the plurality of imbedded functionality within the interior structure of the freeform-fabricated core comprises a plurality of space for components within the interior structure and is further characterized by adding a plurality of components where the plurality of components are received by the plurality of space for components in the interior structure.

79. The method in claim 78 in which the plurality of space for components within the interior structure comprises a space for the first conduit and a space for the second conduit, and the plurality of components comprises a first conduit and a second conduit, where the first conduit is received in the space for the first conduit and the second conduit is received in the space for the second conduit.

80. The method of claim 71 is further characterized by modifying the software file of the three-dimensional design generated by a computer of the freeform-fabricated core to incorporate a plurality of ridges in the exterior surface structure such that the exterior surface structure cooperates with the plurality of composite skins having a predetermined number of layers in a predetermined region of the freeform-fabricated core composite article and cooperates with the plurality of composite skins having a different predetermined number of layers in a different predetermined region of the freeform-fabricated core composite article to compensate for the thickness of the plurality of composite skins thereby providing the desired exterior dimension of the freeform-fabricated core composite article where the ridges form the boundaries between the regions.

81. The method of claim 71 is further characterized by modifying the software file of the three-dimensional design generated by a computer of the freeform-fabricated core to incorporate a plurality of ridges in the exterior surface structure such that the exterior surface structure cooperates with the plurality of composite skins having a predetermined thickness in a predetermined region of the freeform-fabricated core composite article and cooperates with the plurality of composite skins having a different predetermined thickness in a different predetermined region of the freeform-fabricated core composite article to compensate for the thickness of the plurality of composite skins thereby providing the desired exterior dimension of the freeform-fabricated core composite article where the ridges form the boundaries between the regions.

82. The method of claim 71 in which the freeform-fabricated core further comprises a plurality of freeform-fabricated core segments, the plurality of freeform-fabricated core segments are joined together at core joints with fabrication material, wherein the joined freeform-fabricated core segments form the freeform-fabricated core.

83. The method as recited in claim 82 in which the interior structure of the freeform-fabricated core comprises a solid interior structure.

84. The method as recited in claim 82 in which the interior structure of the freeform-fabricated core comprises a non-solid interior structure.

85. The method as recited in claim 82 in which the interior structure of the freeform-fabricated core comprises a combination of a solid interior structure and a non-solid interior structure.

86. The method as recited in claim 82 in which the interior structure of the freeform-fabricated core comprises a plurality of non-solid interior structures.

87. The method as recited in claim 82 in which the interior structure of the freeform-fabricated core comprises non-solid interior structures having a network of interconnected support walls defining the shape of the freeform-fabricated core composite article and leaving voids between the support members and is further characterized by infiltrating the voids with a reinforcing substance.

88. The method of claim 82 further characterized by modifying the software file of the three-dimensional design generated by a computer of the freeform-fabricated core to incorporate a plurality of imbedded functionality within the interior structure of the freeform-fabricated core.

89. The method of claim 88 in which the plurality of imbedded functionality within the interior structure of the freeform-fabricated core comprises a plurality of space for components within the interior structure and is further characterized by adding a plurality of components where the plurality of components are received by the plurality of space for components in the interior structure.

90. The method in claim 89 in which the plurality of space for components within the interior structure comprises a space for the first conduit and a space for the second conduit, and the plurality of components comprises a first conduit and a second conduit, where the first conduit is received in the space for the first conduit and the second conduit is received in the space for the second conduit.

91. The method of claim 82 is further characterized by modifying the software file of the three-dimensional design generated by a computer of the freeform-fabricated core to incorporate a plurality of ridges in the exterior surface structure such that the exterior surface structure cooperates with the plurality of composite skins having a predetermined number of layers in a predetermined region of the freeform-fabricated core composite article and cooperates with the plurality of composite skins having a different predetermined number of layers in a different predetermined region of the freeform-fabricated core composite article to compensate for the thickness of the plurality of composite skins thereby providing the desired exterior dimension of the freeform-fabricated core composite article where the ridges form the boundaries between the regions.

92. The method of claim 82 is further characterized by modifying the software file of the three-dimensional design generated by a computer of the freeform-fabricated core to incorporate a plurality of ridges in the exterior surface structure such that the exterior surface structure cooperates with the plurality of composite skins having a predetermined thickness in a predetermined region of the freeform-fabricated core composite article and cooperates with the plurality of composite skins having a different predetermined thickness in a different predetermined region of the freeform-fabricated core composite article to compensate for the thickness of the plurality of composite skins thereby providing the desired exterior dimension of the freeform-fabricated core composite article where the ridges form the boundaries between the regions.

93. The method of claim 49 further including the step of impregnating the plurality of composite skins with the binding matrix.

94. The method as recited in claim 93 in which the interior structure of the freeform-fabricated core comprises a solid interior structure.

95. The method as recited in claim 93 in which the interior structure of the freeform-fabricated core comprises a non-solid interior structure.

96. The method as recited in claim 93 in which the interior structure of the freeform-fabricated core comprises a combination of a solid interior structure and a non-solid interior structure.

97. The method as recited in claim 93 in which the interior structure of the freeform-fabricated core comprises a plurality of non-solid interior structures.

98. The method as recited in claim 93 in which the interior structure of the freeform-fabricated core comprises non-solid interior structures having a network of interconnected support walls defining the shape of the freeform-fabricated core composite article and leaving voids between the support members and is further characterized by infiltrating the voids with a reinforcing substance.

99. The method of claim 93 further characterized by modifying the software file of the three-dimensional design generated by a computer of the freeform-fabricated core to incorporate a plurality of imbedded functionality within the interior structure of the freeform-fabricated core.

100. The method of claim 99 in which the plurality of imbedded functionality within the interior structure of the freeform-fabricated core comprises a plurality of space for components within the interior structure and is further characterized by adding a plurality of components where the plurality of components are received by the plurality of space for components in the interior structure.

101. The method in claim 100 in which the plurality of space for components within the interior structure comprises a space for the first conduit and a space for the second conduit, and the plurality of components comprises a first conduit and a second conduit, where the first conduit is received in the space for the first conduit and the second conduit is received in the space for the second conduit.

102. The method of claim 93 is further characterized by modifying the software file of the three-dimensional design generated by a computer of the freeform-fabricated core to incorporate a plurality of ridges in the exterior surface structure such that the exterior surface structure cooperates with the plurality of composite skins having a predetermined number of layers in a predetermined region of the freeform-fabricated core composite article and cooperates with the plurality of composite skins having a different predetermined number of layers in a different predetermined region of the freeform-fabricated core composite article to compensate for the thickness of the plurality of composite skins thereby providing the desired exterior dimension of the freeform-fabricated core composite article where the ridges form the boundaries between the regions.

103. The method of claim 93 is further characterized by modifying the software file of the three-dimensional design generated by a computer of the freeform-fabricated core to incorporate a plurality of ridges in the exterior surface structure such that the exterior surface structure cooperates with the plurality of composite skins having a predetermined thickness in a predetermined region of the freeform-fabricated core composite article and cooperates with the plurality of composite skins having a different predetermined thickness in a different predetermined region of the freeform-fabricated core composite article to compensate for the thickness of the plurality of composite skins thereby providing the desired exterior dimension of the freeform-fabricated core composite article where the ridges form the boundaries between the regions.

104. The method of claim 93 in which the freeform-fabricated core further comprises a plurality of freeform-fabricated core segments, the plurality of freeform-fabricated core segments are joined together at core joints with fabrication material, wherein the joined freeform-fabricated core segments form the freeform-fabricated core.

105. The method as recited in claim 104 in which the interior structure of the freeform-fabricated core comprises a solid interior structure.

106. The method as recited in claim 104 in which the interior structure of the freeform-fabricated core comprises a non-solid interior structure.

107. The method as recited in claim 104 in which the interior structure of the free form-fabricated core comprises a combination of a solid interior structure and a non-solid interior structure.

108. The method as recited in claim 104 in which the interior structure of the freeform-fabricated core comprises a plurality of non-solid interior structures.

109. The method as recited in claim 104 in which the interior structure of the freeform-fabricated core comprises non-solid interior structures having a network of interconnected support walls defining the shape of the freeform-fabricated core composite article and leaving voids between the support members and is further characterized by infiltrating the voids with a reinforcing substance.

110. The method of claim 104 further characterized by modifying the software file of the three-dimensional design generated by a computer of the freeform-fabricated core to incorporate a plurality of imbedded functionality within the interior structure of the freeform-fabricated core.

111. The method of claim 110 in which the plurality of imbedded functionality within the interior structure of the freeform-fabricated core comprises a plurality of space for components within the interior structure and is further characterized by adding a plurality of components where the plurality of components are received by the plurality of space for components in the interior structure.

112. The method in claim 111 in which the plurality of space for components within the interior structure comprises a space for the first conduit and a space for the second conduit, and the plurality of components comprises a first conduit and a second conduit, where the first conduit is received in the space for the first conduit and the second conduit is received in the space for the second conduit.

113. The method of claim 104 is further characterized by modifying the software file of the three-dimensional design generated by a computer of the freeform-fabricated core to incorporate a plurality of ridges in the exterior surface structure such that the exterior surface structure cooperates with the plurality of composite skins having a predetermined number of layers in a predetermined region of the freeform-fabricated core composite article and cooperates with the plurality of composite skins having a different predetermined number of layers in a different predetermined region of the freeform-fabricated core composite article to compensate for the thickness of the plurality of composite skins thereby providing the desired exterior dimension of the freeform-fabricated core composite article where the ridges form the boundaries between the regions.

114. The method of claim 104 is further characterized by modifying the software file of the three-dimensional design generated by a computer of the freeform-fabricated core to incorporate a plurality of ridges in the exterior surface structure such that the exterior surface structure cooperates with the plurality of composite skins having a predetermined thickness in a predetermined region of the freeform-fabricated core composite article and cooperates with the plurality of composite skins having a different predetermined thickness in a different predetermined region of the freeform-fabricated core composite article to compensate for the thickness of the plurality of composite skins thereby providing the desired exterior dimension of the freeform-fabricated core composite article where the ridges form the boundaries between the regions.

115. The method of claim 71 further including the step of impregnating the plurality of composite skins with the binding matrix.

* * * * *